(12) United States Patent
Pott et al.

(10) Patent No.: US 6,941,748 B2
(45) Date of Patent: Sep. 13, 2005

(54) METHOD FOR DESULFURIZATION OF AN $NO_x$ STORAGE ACCUMULATOR-CATALYST ARRANGED IN AN EXHAUST SYSTEM OF AN INTERNAL COMBUSTION ENGINE

(75) Inventors: Ekkehard Pott, Gifhorn (DE); Hermann Hahn, Hannover (DE); Ulrich Goebel, Hattersheim (DE); Juergen Hoehne, Hanau (DE)

(73) Assignees: Volkwagen AG, Wolfsburg (DE); OMG AG & Co. KG, Hanau (DE)

(*) Notice: Subject to any disclaimer, the term of this patent is extended or adjusted under 35 U.S.C. 154(b) by 0 days.

(21) Appl. No.: 10/168,157

(22) PCT Filed: Dec. 5, 2000

(86) PCT No.: PCT/EP00/12210
§ 371 (c)(1),
(2), (4) Date: Dec. 9, 2002

(87) PCT Pub. No.: WO01/44630
PCT Pub. Date: Jun. 21, 2001

(65) Prior Publication Data
US 2003/0131591 A1 Jul. 17, 2003

(30) Foreign Application Priority Data
Dec. 17, 1999 (DE) .......................... 199 61 165

(51) Int. Cl.$^7$ ............................................... F01N 3/00
(52) U.S. Cl. ............................. 60/295; 60/274; 60/276; 60/301
(58) Field of Search ........................... 60/274, 276, 277, 60/295, 301, 285

(56) References Cited

U.S. PATENT DOCUMENTS

| 5,771,685 A | | 6/1998 | Hepburn | |
|---|---|---|---|---|
| 5,778,666 A | * | 7/1998 | Cullen et al. | 60/274 |
| 5,953,907 A | * | 9/1999 | Kato et al. | 60/274 |
| 5,974,788 A | * | 11/1999 | Hepburn et al. | 60/274 |
| 6,119,450 A | * | 9/2000 | Boegner et al. | 60/274 |
| 6,164,064 A | * | 12/2000 | Pott | 60/277 |
| 6,171,565 B1 | * | 1/2001 | Hohne et al. | 423/239.1 |
| 6,497,092 B1 | * | 12/2002 | Theis | 60/274 |

FOREIGN PATENT DOCUMENTS

| DE | 43 42 656 | 6/1994 |
|---|---|---|
| DE | 196 04 607 | 8/1996 |
| DE | 197 05 335 | 9/1998 |
| DE | 198 13 654 | 9/1999 |
| DE | 198 16 175 | 10/1999 |
| DE | 199 18 875 | 10/1999 |
| DE | 198 27 195 | 12/1999 |
| DE | 199 18 756 | 10/2000 |
| EP | 0 899 430 | 3/1999 |
| GB | 2 324 052 | 10/1998 |
| WO | WO 99/61763 | 12/1999 |

* cited by examiner

Primary Examiner—Thomas Denion
Assistant Examiner—Diem Tran
(74) Attorney, Agent, or Firm—Kenyon & Kenyon

(57) ABSTRACT

A method for the desulfurization of an $NO_x$ storage catalyst arranged in an exhaust system of an internal combustion engine, whereby, for the desulfurization, the internal combustion engine is alternatingly operated in a lean mode at $\lambda>1$ and a rich mode at $\lambda<1$. During the desulfurization process, the present invention provides for the progress of the desulfurization being monitored, using a change in a parameter relating to intervals ($I_n$), whereby the interval ($I_n$) lasts from the beginning of an $n_{th}$ rich operating phase ($T_{f,n}$), until the measured value drops below a predetermined lambda threshold value ($S_f$) downstream from the $NO_x$ storage catalyst (16). Furthermore, the progress of the desulfurization is monitored, using a change in a lambda probe voltage ($U_n$) downstream from the $NO_x$ storage catalyst (16), which is determined at the end of a predetermined interval at the beginning of an $n_{th}$ rich operating phase ($T_{f,n}$).

25 Claims, 5 Drawing Sheets

US 6,941,748 B2

METHOD FOR DESULFURIZATION OF AN $NO_x$ STORAGE ACCUMULATOR-CATALYST ARRANGED IN AN EXHAUST SYSTEM OF AN INTERNAL COMBUSTION ENGINE

FIELD OF THE INVENTION

The present invention relates to a method for desulfurization of an NOx storage catalyst arranged in an exhaust duct of a combustion engine.

BACKGROUND INFORMATION

It is conventional that catalysts, in particular $NO_x$ storage catalysts, are used to purify exhaust gases of combustion engines. The combustion engine is operated in a lean mode, in which the lambda value is greater than 1, i.e. there is an excess of oxygen in relation to the amount of fuel in the air-fuel mixture. In this operating mode, the proportion of environmentally harmful exhaust-gas components formed, such as carbon monoxide CO and incompletely burned hydrocarbons HC, is relatively small, and, due to the excess oxygen, they can be completely converted into compounds that are environmentally less relevant. On the other hand, the relatively large amounts of nitrogen oxides $NO_x$ formed in the lean mode cannot be completely reduced and are stored in the $NO_x$ storage catalyst in the form of nitrates. The $NO_x$ absorber is regenerated in regular intervals, in which the combustion engine is operated in a lean mode at $\lambda \leq 1$, and the reducing agents CO, HC, and $H_2$ are formed to a sufficient extent, so that the stored nitrogen oxides can be quantitatively converted to nitrogen. In the rich mode, the release of nitrogen oxides from the $NO_x$ storage catalyst is aided by high temperatures at the catalyst.

In addition to the described storage of NOx, the storage of $SO_x$ in the form of sulfates also occurs in the $NO_x$ absorber in the lean mode. The absorption of $SO_x$ reduces the storage capacity of the absorber and the catalytically active surface area of the catalyst. Furthermore, the formation of sulfate particles can also bring about corrosive processes on the surface of the catalyst and cause irreversible damage to the $NO_x$ storage catalyst.

It is conventional to periodically carry out desulfurization processes, which include supplying rich exhaust gas, i.e. exhaust gas having a $\lambda \leq 1$, to the $NO_x$ storage catalyst, and setting a minimum temperature of approximately 600° C. that exceeds the $NO_x$ desorption temperature.

According to Published German Patent Application 198 358 08, the desulfurization is preferably not carried out in a constant rich mode of the combustion engine, at a rich lambda value, but rather by alternatingly supplying the $NO_x$ storage catalyst with rich and lean exhaust gas. In this manner, the release of poisonous and malodorous hydrogen sulfide $H_2S$, whose formation may be kinetically inhibited in favor of the formation of sulfur dioxide $SO_2$, can be suppressed almost completely.

The need for desulfurization may be determined, e.g. using $NO_x$ sensors, by detecting decreasing $NO_x$ storage activity or an $NO_x$ breakthrough in the lean exhaust gas in so doing, a fall in the $NO_x$ storage activity may be detected by comparing the measured $NO_x$ flow rate to a measured or modeled $NO_x$ flow-rate characteristic of a regenerated $NO_x$ storage catalyst. For lack of suitable sulfur sensors, sulfur contamination may presently be inferred from falling $NO_x$ activity, but not on the basis of a direct sulfur measurement.

As may be the case with determining the necessity for desulfurization, the success of a desulfurization process may also be determined on the basis of the $NO_x$ concentrations in front of and behind the catalyst, by merely detecting a recovery of the $NO_x$ activity. In this case, one also deduces that a residual amount of sulfur remains, by comparing the measured $NO_x$ flow rate to the state of a regenerated $NO_x$ storage catalyst. In this method it is not possible to check the progress during the desulfurization itself, but rather its success may be assessed after the desulfurization is finished. Since, in order to accomplish this, the $NO_x$ storage catalyst must first be re-cooled to the working temperature of approximately 200° C. to 500° C. and, when desulfurization is unsuccessful, reheated to the desulfurization temperature of greater than 600° C., this method is associated with higher fuel consumption. On the other hand, excessively long desulfurization procedures may thermally damage the $NO_x$ storage catalyst.

SUMMARY

Therefore, an object of the present invention is to provide a method for the desulfurization of a generic $NO_x$ storage catalyst arranged in an exhaust duct of a combustion engine, which allows the progress of the desulfurization to be monitored in an analog manner during the desulfurization process. In so doing, the formation of $H_2S$ may be suppressed and the desulfurization time may be adjusted to the actual state of contamination of the $NO_x$ storage catalyst, so that the fuel consumption may be kept low and excessive thermal damage to the $NO_x$ storage catalyst may be prevented.

It was found that the decreasing amount of stored sulfates in the course of desulfurization caused increasingly smaller amounts of reducing agent to be consumed during the rich operating phases. Associated with this is the observation of increasingly shorter intervals, in which significant sulfate reduction occurs. An example embodiment of the present invention allows the progress of desulfurization to be monitored, using a curve of the size of intervals during the desulfurization process, the interval lasting from the beginning of a rich operating phase until the lambda value downstream from the $NO_x$ storage catalyst falls below a specifiable lambda threshold value. In this case, the threshold value is less than 1 and greater than a preselected lambda value in front of the $NO_x$ storage catalyst.

Another example embodiment of the method according the present invention provides for the beginning of a rich operating phase being defined by the point at which the lambda value in front of the $NO_x$ storage catalyst falls below the specifiable lambda threshold value.

Another example embodiment of the method provides for the difference of an $n_{th}$ interval and a preceding $(n-i)_{th}$ being calculated, i denoting a positive whole number. When the difference falls below a specifiable limiting value for the difference at least once, the desulfurization is ended. In this example embodiment, the difference of the $n_{th}$ interval and an $(n-1)_{th}$ interval directly preceding it may be calculated.

Another example embodiment of the method provides for the size of an interval corresponding to its temporal length. Therefore, an $n_{th}$ interval may be determined by measuring the time at which it begins and ends. Another example embodiment of the method according the present invention provides for the mass of exhaust gas passing through the $NO_x$ storage catalyst for the duration of an interval determining the size of the interval. For example, this mass may be determined by a conventional mass flow rate sensor for air. According to another example embodiment, a higher accuracy may be achieved by measuring the size of an interval, using the mass of reducing agent passing through the $NO_x$ catalyst during the interval. The mass of reducing agent passing through may be calculated in a conventional manner, from the measured mass of exhaust gas passing through and the lambda value in front of the $NO_x$ storage catalyst.

According to another example embodiment of the method according to the present invention, the progress of the desulfurization process may also be monitored, using the time characteristic of a lambda-probe voltage downstream from the $NO_x$ storage catalyst, the lambda-probe voltage being ascertained after a specifiable interval after the beginning of an $n_{th}$ rich operating phase, since, when customary step-response lambda probes and constant, rich operating phases are used, the lambda-probe voltage measured in back of the $NO_x$ storage catalyst assumes higher and higher values as the desulfurization progresses. This in turn may be attributed to the decreasing amount of stored sulfates, which causes the lambda value behind the $NO_x$ storage catalyst to decrease earlier and earlier during a rich operating phase.

In another example embodiment of the method according to the present invention, the progress of desulfurization may be assessed by measuring the lambda-probe voltage behind the $NO_x$ storage catalyst after a specifiable period of time after the beginning of each rich operating phase, and by tracking its characteristic over the time period of desulfurization.

In another example embodiment, the lambda-probe voltage may be measured after a specifiable mass of reducing agent or exhaust gas passes through, after the beginning of each rich operating phase, and the curve of the lambda-probe voltage may be tracked.

In another example embodiment, the specifiable interval may correspond to the length of the rich operating phases, regardless of whether the interval is a period of time, a mass of exhaust gas, or a mass of reducing agent. This example embodiment provides for the maximum lambda-probe voltage in back of the $NO_x$ storage catalyst being ascertained at the end of each rich operating phase.

Further example embodiments of the present invention follow from the remaining features described below.

DETAILED DESCRIPTION

Figure 1:
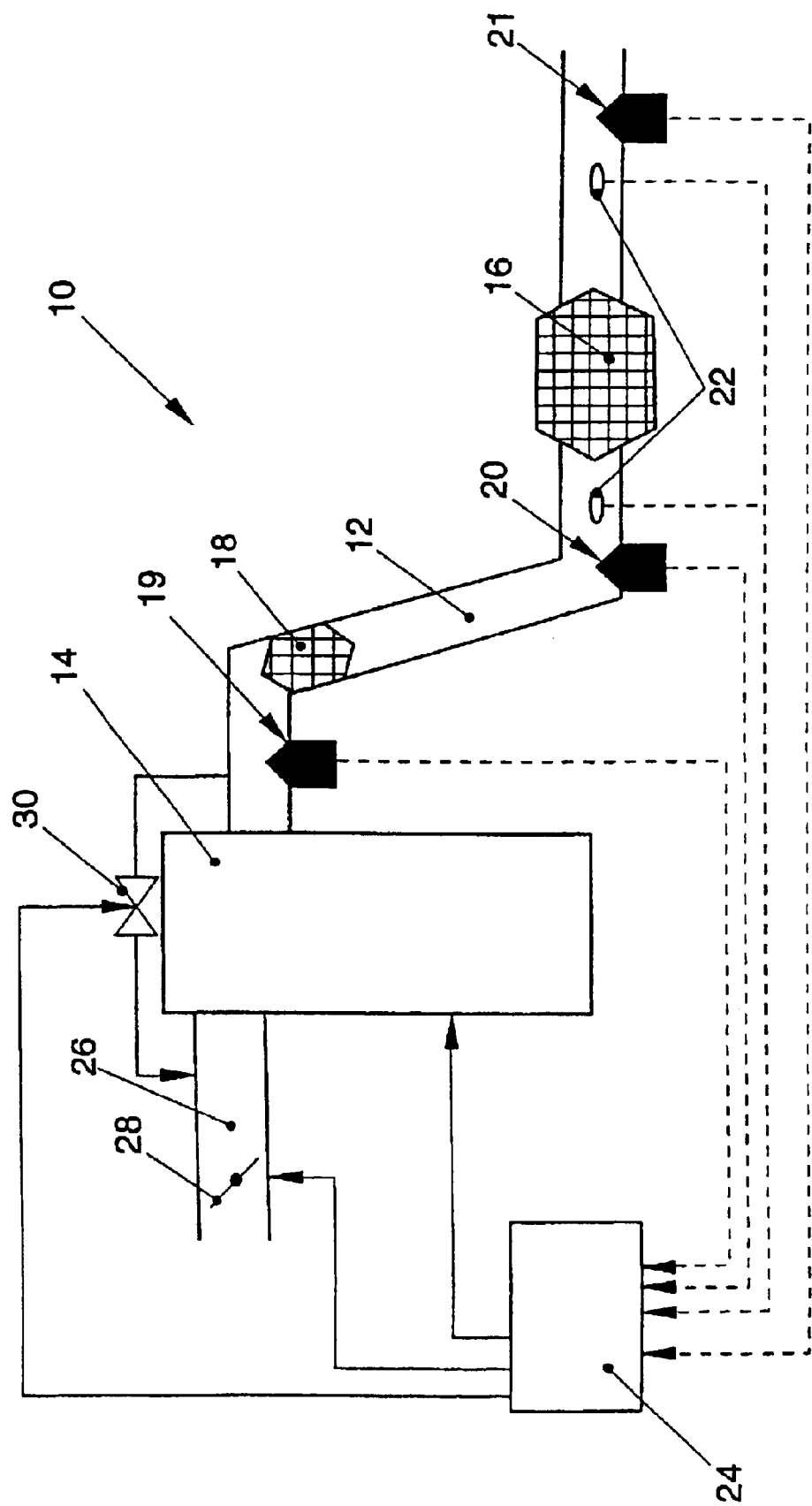
FIG. 1 is a schematic view of the arrangement of a catalytic-converter system in an exhaust duct of a combustion engine.

The configuration of a catalytic-converter system 10 in an exhaust duct 12 of a combustion engine 14 is schematically illustrated in FIG. 1. Catalytic-converter system 10 includes an $NO_x$ storage catalyst 16, a preliminary catalyst 18, as well as various temperature sensors 22. In addition, gas sensors 19, 20, 21 may be arranged at different positions in exhaust duct 12. These gas sensors may be used to detect at least one gas component of an exhaust gas of combustion engine 14, and transmit a signal to engine control unit 24 as a function of the concentration of the measured gas component. Such gas sensors 19, 20, 21 are conventional and may be lambda probes or $NO_x$ sensors.

All of the signals supplied by temperature sensors 22 and gas sensors 19, 20, 21 are transmitted to an engine control unit 24. A working mode of combustion engine 14 may be controlled by engine control unit 24 in response to the measured gas values. If, for example, a working mode having $\lambda<1$, i.e. a rich atmosphere, is necessary, then the oxygen concentration in an intake manifold 26 may be reduced upstream from combustion engine 14, in that engine control unit 24 reduces, for example, the volumetric flow rate of air drawn in, using a throttle valve 28, and/or directs low-oxygen exhaust gas back through an exhaust-gas return valve 30, into intake manifold 26. This increases the concentrations of the reducing gas components CO, HC, and $H_2$ in the exhaust gas in relation to the concentration of oxygen.

However, in order to set a working mode having $\lambda>1$, i.e. a lean atmosphere, throttle valve 28 may be opened. Under these conditions, in which a deficiency of reducing gas components prevails in the exhaust gas, these gas components may be almost completely converted, i.e. oxidized, in preliminary catalyst 18, whereas nitrogen oxides NOx, of which there may be an excess, and also $So_2$, may be absorbed in $NO_x$ storage catalyst 16. In recurring intervals, the catalyst may be supplied with a rich exhaust gas as a function of the $NO_x$ storage capacity, in order to regenerate the catalyst. In the process, the previously absorbed $NO_x$ may be reduced on a catalytically active surface of $NO_x$ storage catalyst 16. However, $SO_2$ simultaneously stored in $NO_x$ storage catalyst 16 in the form of sulfate may not be removed in this regeneration process, since, in contrast to the storage of NOx, the reversibility of the $SO_2$ storage requires considerably higher temperatures.

The need for desulfurization may be determined, for example, using the $NO_x$ storage activity of $NO_x$ storage catalyst 16. An $NO_x$ breakthrough curve may be measured by a gas sensor 21, which detects the $NO_x$ concentration behind $NO_x$ storage catalyst 16. Sulfur contamination of $NO_x$ storage catalyst 16 may be deduced by comparing this value to theoretical or empirical models, or to the $NO_x$ concentration in front of $NO_x$ storage catalyst 16, which may be measured by at least one of the gas sensors 19 or 20. If sulfur contamination of $NO_x$ storage catalyst 16 has occurred, then it may be first brought to a temperature corresponding to or exceeding the minimum desulfurization temperature. The current temperature at $NO_x$ storage catalyst 16 may be measured, for example, by temperature sensors 22.

Figure 2:
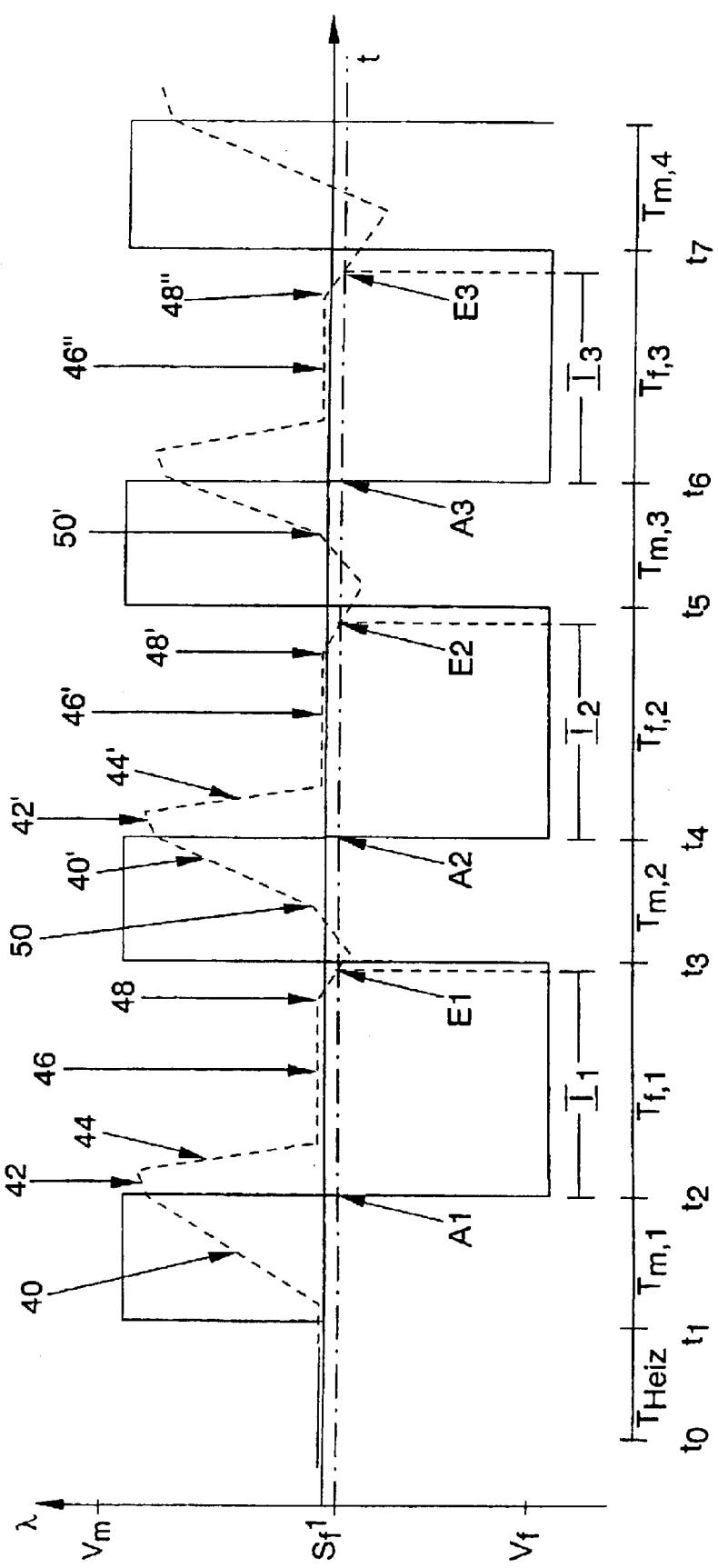
FIG. 2 is an illustration of an exemplary simplified curve of a lambda value measured in front of and behind an $NO_x$ storage catalyst during desulfurization.

FIG. 2 illustrates, by way of example, a simplified curve of a lambda value in front of and behind $NO_x$ storage catalyst 16, during a desulfurization procedure.

In this case, the solid line represents the specifiable characteristic of the lambda value in front of $NO_x$ storage catalyst 16, the lambda value being measurable by gas sensor 20. However, the dotted line represents the curve of the lambda value measured by the gas sensor 21 behind $NO_x$ storage catalyst 16. After it is determined that desulfurization may be necessary, the temperature of $NO_x$ storage catalyst 16 may be initially set, at time t0, to the necessary desulfurization temperature, in a heating phase $T_{heating}$. This may be accomplished in a conventional manner by controlling, for example, at least one operating parameter of combustion engine 14 to increase the exhaust temperature.

As soon as the minimum temperature is reached at time t1, combustion engine 14 may be controlled with the aid of engine control unit 24 such that, in front of $NO_x$ storage catalyst 16, a specifiable lambda value $V_m$ greater than 1 sets in over the period of a first lean phase $T_{m,1}$. Because of the dead volume of $NO_x$ storage catalyst 16 and the oxygen stored in it, an increase of the lambda value behind $NO_x$ storage catalyst 16 may be observed after a time delay. The lambda value behind $NO_x$ storage catalyst 16 then increases in region 40. The higher the specified value for lambda $V_m$, the greater the slope of the increase. At time t2, the operating mode switches from the lean operating mode to a rich operating mode, whereupon engine control unit 24 changes combustion engine 14 over to a rich working mode so that, over a first rich phase $T_{f,1}$, a lambda value <1 sets in in front of $NO_x$ storage catalyst 16, in accordance with setpoint selection $V_f$. After the shift to the rich operating mode, the lambda value behind $NO_x$ storage catalyst 16 continues to increase for a short time in region 42, in order to then sharply decrease to a lambda value=1 in region 44. The lambda value remains at 1, until the oxygen stored in $NO_x$ storage catalyst 16, the stored sulfate, and any nitrate still present are converted by the reducing agents present in excess in the rich operating phase, to the point where the lambda value begins to drift below 1 in region 48. At time t3, a change in the operating mode of combustion engine 14 may be initiated again, whereby second, lean operating phase $T_{m,2}$ begins. The reaction of the lambda value behind $NO_x$ storage catalyst 16 to changed operating conditions may be in turn delayed, depending on the volume, so that, shortly after the beginning of second lean phase $T_{m,2}$, the lambda value reaches a minimum that is below threshold value $S_f$. An increase in the lambda value follows in region 50, the slope of the lambda value being a function of not only the position of lambda setpoint $V_m$, but also the oxygen stored in $NO_x$ storage catalyst 16 in this phase. After the oxygen storage capacity is exhausted, a steep increase in the lambda value may be observed in region 40', the slope in this region being exclusively determined by the position of lambda setpoint $V_m$. After second rich phase $T_{f,2}$ is initiated, the lambda in back of $NO_x$ storage catalyst 16 decreases rapidly in region 44', after a time delay (region 42'), the decrease being followed by a phase 46', in which the lambda value remains at λ=1.

Because the amount of stored sulfates may be smaller than that in first rich phase $T_{f,1}$, the duration of phase 46', in which the reducing agents are completely converted, may be reduced in comparison with phase 46. Consequently, the start of a lambda decline in phase 48' in the direction of rich lambda setpoint $V_f$ may be observed at an earlier time after the start of the rich phase, than in first rich phase $T_{f,1}$. This trend continues in the subsequent rich phases. Thus, the region 46" observed in third rich phase $T_{f,3}$ may be even shorter than 46', and the fall of the lambda value below 1 in region 48" may be observed even earlier.

The present invention may allow for the progress of desulfurization to be tracked, in that the length of a time interval $I_n$, which extends from the beginning of rich operating phase to the point where the lambda value downstream from $NO_x$ storage catalyst 16 falls below a specifiable lambda threshold value $S_f$, may be ascertained for each rich operating phase and tracked over the course of the desulfurization. The times, at which the lambda value behind $NO_x$ storage catalyst 16 reaches or falls below lambda threshold value $S_f$, are denoted in the diagram by reference numerals E1, E2, and E3. In order to ensure that a rich operating phase $T_{f,n}$ begins in a uniform manner, there may be defined the points A1, A2, and A3, at which the lambda value in front of $NO_x$ storage catalyst 16 falls below lambda threshold value $S_f$, as the beginning of the rich operating phase. Consequently, even a less ideal curve of the lambda value in front of $NO_x$ storage catalyst 16 may be considered.

Figure 3:
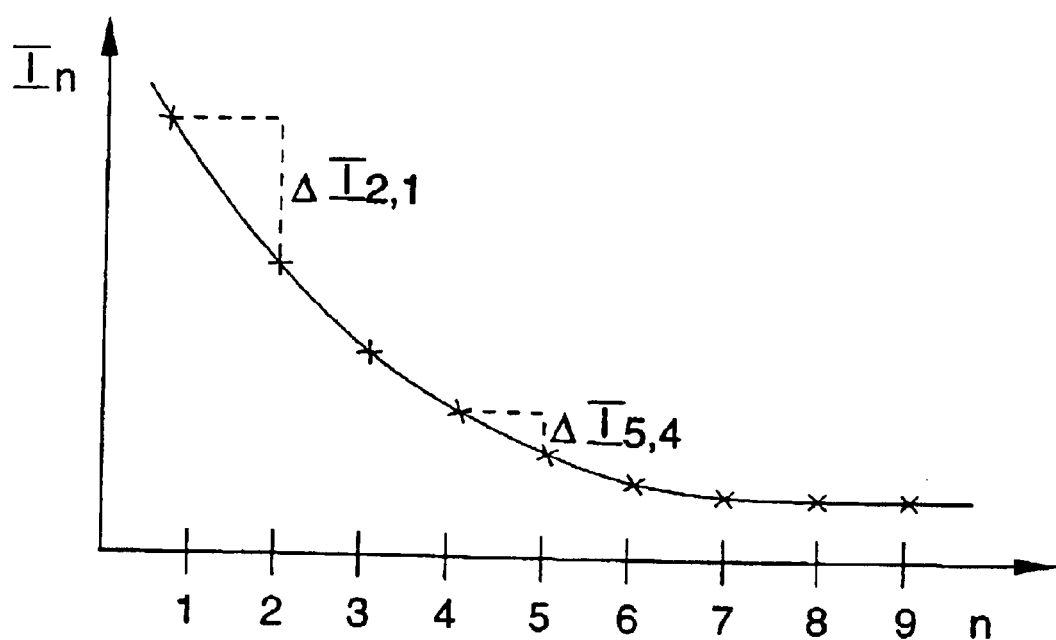
FIG. 3 is an illustration of an exemplary curve of the time interval versus the number of rich operating intervals.

FIG. 3 illustrates the curve of the time intervals $I_n$ ascertained in the manner described, versus the number n of rich operating intervals. While time intervals $I_n$ are still very long at the beginning of the desulfurization procedure, the following curve illustrates that they decline rapidly at first, in order to later approach a limiting value.

An interval $I_n$ that practically doesn't change any more indicates that the desulfurization may be essentially complete. The present invention provides for the progress of the desulfurization procedure being checked, for example, by calculating the difference of a time interval $I_n$ and a preceding time interval $I_{n-i}$. The difference of a time interval $I_n$ and a time interval $I_{n-1}$ directly preceding it may be determined. In FIG. 3, the interval differences between the first and second rich operating phases $\Delta I_{2,1}$ and the fourth and fifth rich operating phases $\Delta I_{5,4}$ are illustrated by way of example. The magnitude of interval differences $\Delta I_{n,n-1}$ declines rapidly in the course of the desulfurization procedure. The present invention now provides for the criterion for ending the desulfurization being when a currently ascertained interval difference $\Delta I_{n,n-1}$ falls below a specifiable limiting value for the difference $\Delta I_G$. In order to design the method to be more reliable in the case of operating fluctuations, the criterion for ending the desulfurization may be selected to be when the interval difference falls below the specifiable limiting value $\Delta I_G$ for the difference several times, e.g. two times.

A time interval $I_n$ may be ascertained, for example, by directly detecting its beginning and ending times. This may be done by having the probe 20 in front of $NO_x$ storage catalyst 16 transmit the current lambda values to engine control unit 24. The time, at which the lambda value in front of $NO_x$ storage catalyst 16 falls below threshold value $S_f$, may be detected by engine control unit 24 and registered as the beginning of an interval $I_n$. The time, at which the lambda value measured by gas probe 21 behind $NO_x$ storage catalyst 16 also reaches threshold value $S_f$, may be recognized by engine control unit 24 as the end point of an interval $I_n$. Engine control unit 24 subsequently calculates the length of interval $I_n$ and the difference of current interval $I_n$ and a preceding interval $I_{n,n-i}$. If engine control unit 24 determines that a preselected termination criterion was satisfied, e.g. that a limiting value $\Delta I_G$ for the difference was undershot, then engine control unit 24 ends the desulfurization procedure by using the actuating arrangement for throttle valve 28 and exhaust-gas return valve 30 to control the operating conditions of combustion engine 14 in accordance with normal operation.

In contrast to the described procedure, the length of a time interval $I_n$ may also be measured by determining a mass of reducing agent $m_{Red,n}$ or exhaust gas $m_{Gas,n}$, which flows through the exhaust system from the time at which the lambda value in front of $NO_x$ storage catalyst 16 falls below threshold value $S_f$, to the time at which the lambda value behind $NO_x$ storage catalyst 16 falls below threshold value $S_f$. The mass of reducing agent $m_{Red,n}$ may be calculated from a measured mass flow rate of exhaust gas and a lambda value, in a manner that is conventional. The monitoring of the desulfurization, using masses of gas that have passed through instead of time intervals, may be less sensitive to fluctuating operating conditions.

Figure 4:
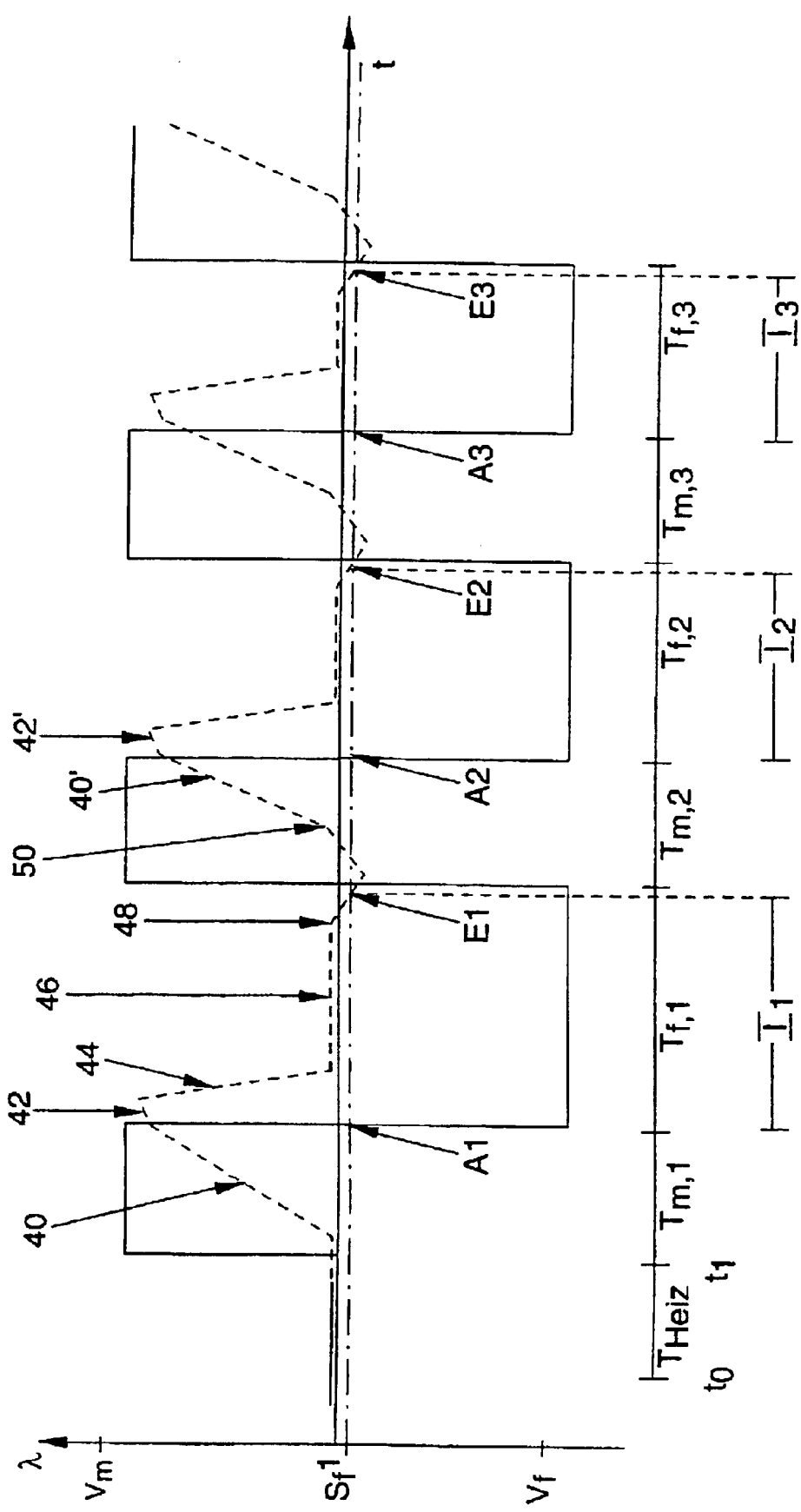
FIG. 4 is an illustration of an exemplary simplified curve of a lambda value measured in front of and behind an $NO_x$ storage catalyst during a dynamically controlled desulfurization process.

Another example embodiment of the present invention provides for the operation to be shifted from a rich operating mode $T_{f,n}$ to a lean operating mode $T_{m,n}$, when the lambda value behind $NO_x$ storage catalyst 16 falls below threshold value $S_f$ (points En in FIG. 2). FIG. 4 illustrates an example of the curves of the lambda values in front of and behind $NO_x$ storage catalyst 16 for such a dynamically controlled desulfurization. In this example embodiment, the lengths of time intervals $I_n$ and the lengths of the respective rich phases $T_{f,n}$ exactly correspond to each other. In the course of the desulfurization method, the lengths of rich phases $T_{f,n}$ accordingly become progressively smaller. The result of this example embodiment of the method may be the successful suppression of a pollutant breakthrough, which may be associated with the lambda value behind $NO_x$ storage catalyst 16 falling below 1. The above-mentioned features not only apply to temporally determined intervals, but also analogously apply to intervals that are determined on the basis of the mass of exhaust gas or reducing agent.

Figure 5:
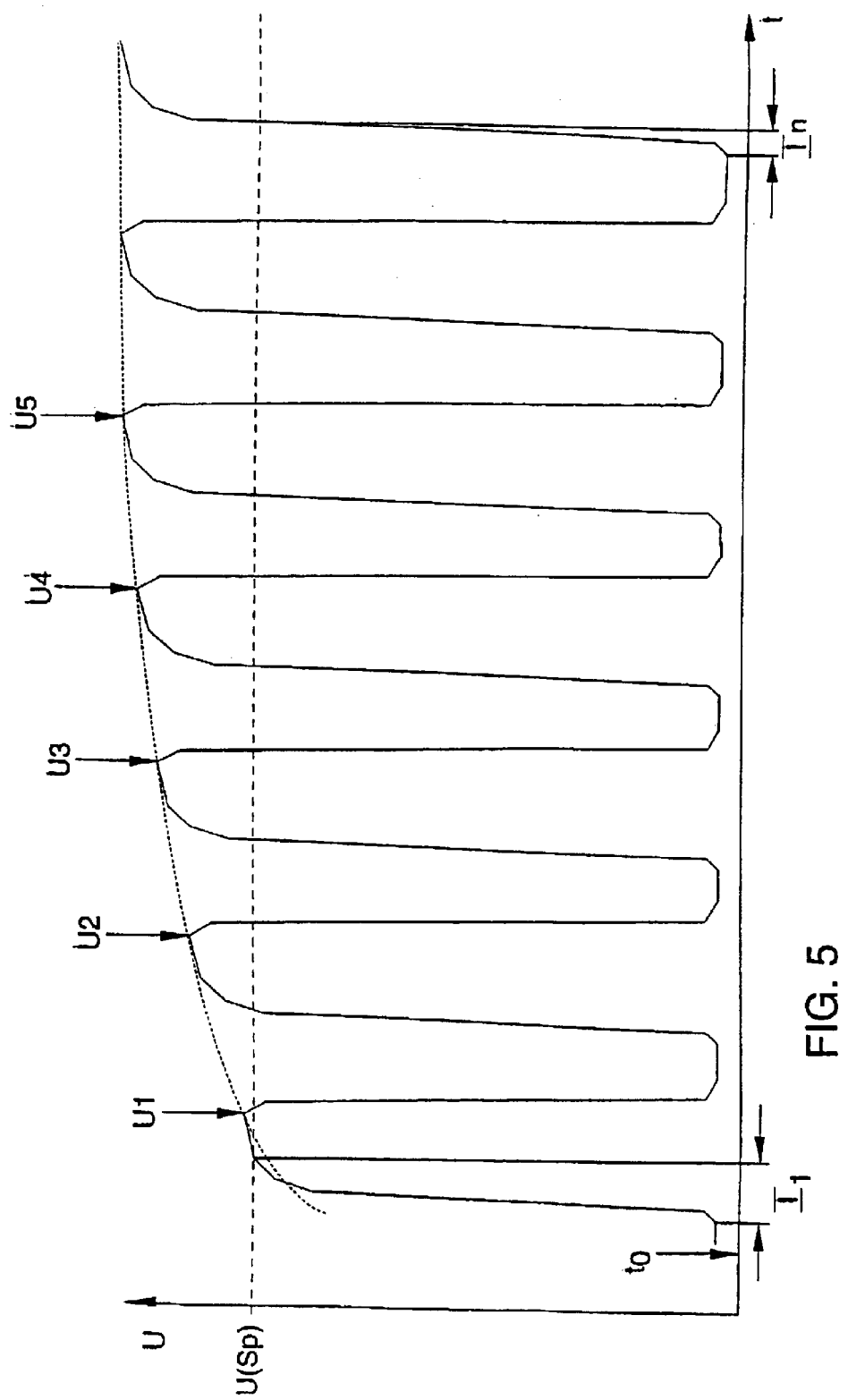
FIG. 5 is an illustration of an exemplary curve of the lambda-probe voltage behind the $NO_x$ storage catalyst during desulfurization.

According to another example embodiment of the method according to the present invention, the progress of the desulfurization process may also be tracked on the basis of the curve of a lambda-probe voltage $U_n$ downstream from $NO_x$ storage catalyst 16 versus time, during rich operating phases $T_{f,n}$. Because of the decreasing amount of stored sulfates in $NO_x$ storage catalyst 16, the lambda value behind $NO_x$ storage catalyst 16 may be observed to fall further and further below 1 (cf. FIG. 2), when the length of rich intervals $T_{f,n}$ remains constant. According to the method, lambda-probe voltage $U_n$ may be measured after a constant, specifiable interval after the start of an $n_{th}$ rich operating phase $T_{f,n}$. In this context, the beginning of rich operating phase $T_{f,n}$ may be determined again by a fall in the lambda value in front of $NO_x$ storage catalyst 16 below lambda threshold value $S_f$, which has the above-mentioned definition. The specifiable interval may be a time period or a specifiable mass of exhaust gas mGas or reducing agent mRed passing through $NO_x$ storage catalyst 16. The specifiable interval may be selected to correspond to the length of a rich operating phase $T_{f,n}$. According to this example embodiment, lambda-probe voltage $U_n$ may be therefore measured at the end of a rich operating phase $T_{f,n}$. The curve of the lambda-probe voltage in back of $NO_x$ storage catalyst 16 during the desulfurization is illustrated in FIG. 5. It can be seen here, that the length of a time interval $I_n$ during a rich operating phase $T_{f,n}$ progressively decreases with increasing desulfurization time, until a lambda-probe voltage $U_{sf}$ corresponding to lambda threshold value $S_f$ is reached. Associated with this is a slope of the lambda-probe voltage that becomes increasingly large during rich phases $T_{f,n}$. An example of a useful termination criterion for the desulfurization may again be a when the difference $\Delta U_{n,n-i}$ of a lambda-probe voltage $U_n$ and a preceding lambda-probe voltage $U_{n-i}$ falls below a specifiable limiting value $\Delta U_G$ for the difference.

If the progress of desulfurization is monitored, using a lambda-probe voltage $U_n$, then it may be necessary to work with constant lengths of rich phases $T_{f,n}$. For this reason, this specific exemplary embodiment of the present invention may be associated with a breakthrough of pollutants such as carbon monoxide and unburned hydrocarbons, which becomes increasingly intense. However, a result of this may be that, in the individual rich phases $T_{f,n}$, $NO_x$ storage catalyst 16 and its lower catalytic layers are quantitatively flushed by the rich exhaust-gas atmosphere. This may considerably reduce the time of desulfurization.

In the exemplary embodiments listed above, the monitoring of the desulfurization method according to the present invention was explained on the basis of a curve of the lambda value in front of $NO_x$ storage catalyst 16, in accordance with a predetermined rectangular profile. However, the method of the present invention may be used with equal success, when other curves of the lambda value in front of $NO_x$ storage catalyst 16 are used as a basis during the desulfurization, e.g. curves in the form of a triangular profile, or also complicated patterns. In another example embodiment, a shift from a lean to a rich operating mode of the combustion engine may be triggered by a specifiable, upper lambda threshold value $S_m$ behind $NO_x$ storage catalyst 16 being exceeded, $S_m$ being selected to be greater than 1 and less than lean lambda setpoint $V_m$. It may be also possible to trigger the shift between lean and rich operating modes, using selected time delays after threshold values $S_m$ and $S_f$ behind $NO_x$ storage catalyst 16 are exceeded and undershot, respectively.

In order to be able to measure the present invention's monitoring variables of time interval $I_n$ or lambda-probe voltage $U_n$ in an reproducible manner, it may be useful to vary lean and rich lambda setpoints $V_m$ and $V_f$ as little as possible during the desulfurization. The same applies for varying the delay times when switching operating modes. In practice, strict lambda setpoints may result in effects, e.g. sudden drops in torque, under certain operating conditions. Under such conditions, a small variation in the lambda setpoints has not proven to be critical for successfully applying the method of the present invention. Fluctuations in the monitoring variables due to varying lambda setpoints may be taken into consideration by applying stricter termination criteria, such as a preselected limiting value for the difference being undershot sufficiently often.

The method of the present invention provides a sensitive instrument for monitoring the progress of desulfurization. Therefore, the duration of desulfurization may be adjusted to the actual, present need. This allows both fuel to be conserved and thermal damage to the catalyst from excessive desulfurization times to be prevented. In addition, the use of the method allows damage to the $NO_x$ storage catalyst 16 not caused by sulfur to be detected, for if the expected $NO_x$ storage activity is not attained again after one of the desulfurization methods according to the present invention, it may be inferred that $NO_x$ storage catalyst 16 has damage not attributable to sulfur, e.g. thermal damage.

What is claimed is:

1. A method for desulfurization of an $NO_x$ storage catalyst arranged in an exhaust duct of a combustion engine, at least one lambda probe arranged downstream from the $NO_x$ storage catalyst, comprising the steps of:
   alternatingly operating the combustion engine in a lean operating mode and a rich operating mode; and
   monitoring progress of desulfurization in accordance with a characteristic curve of a size of intervals during the desulfurization process;
   wherein the interval lasts from a beginning of a rich operating phase to a point that a lambda value downstream from the $NO_x$ storage catalyst falls below a specifiable lambda threshold value, the specifiable threshold value having a value less than 1 and greater than a preselected lambda value in front of the $NO_x$ storage catalyst; and
   wherein, during desulfurization, a temperature of the $NO_x$ storage catalyst one of equals and exceeds a minimum desulfurization temperature.

2. The method according to claim 1, further comprising the step of determining the beginning of the rich operating phase by the point at which the lambda value in front of the $NO_x$ storage catalyst falls below the specifiable lambda threshold value.

3. The method according to claim 1, further comprising the step of triggering a shift from the rich operating mode to the lean operating mode in accordance with the lambda value downstream from the $NO_x$ storage catalyst falling below a specifiable lambda threshold value.

4. The method according to claim 1, further comprising the steps of:
calculating a difference of an interval and a preceding interval; and
ending the desulfurization when the difference falls below a specifiable limiting value for the difference.

5. The method according to claim 4, wherein the calculating step includes the substep of calculating the difference between the interval and an immediately preceding interval.

6. The method according to claim 1, wherein the size of the interval corresponds to its temporal length.

7. The method according to claim 1, wherein the size of the interval corresponds to a mass of exhaust gas passing through the $NO_x$ storage catalyst during the interval.

8. The method according to claim 7, wherein the size of the interval corresponds to a mass of reducing agent passing through the $NO_x$ storage catalyst during the interval.

9. The method according to claim 1, wherein a time characteristic of the lambda value in front of the $NO_x$ storage catalyst corresponds to a rectangular profile during desulfurization.

10. The method according to claim 1, wherein a time characteristic of the lambda value in front of the $NO_x$ storage catalyst corresponds to a triangular profile during desulfurization.

11. The method according to claim 1, further comprising the step of triggering a shift from the lean operating mode to the rich operating mode in accordance with a specifiable lambda threshold value downstream from the $NO_x$ storage catalyst being exceeded, wherein the specifiable lambda threshold value downstream from the $NO_x$ storage catalyst is greater than 1 and less than a preselected lambda value in front of the $NO_x$ storage catalyst.

12. A method for desulfurization of an $NO_x$ storage catalyst arranged in an exhaust duct of a combustion engine, at least one lambda probe arranged downstream from the $NO_x$ storage catalyst, comprising the steps of:
alternatingly operating the combustion engine in a lean operating mode and a rich operating mode;
monitoring progress of desulfurization in accordance with a characteristic curve of a size of intervals during the desulfurization process, the interval lasting from a beginning of a rich operating phase to a point that a lambda value downstream from the $NO_x$ storage catalyst falls below a specifiable lambda threshold value, the specifiable threshold value having a value less than 1 and greater than a preselected lambda value in front of the $NO_x$ storage catalyst; and
triggering a change between the lean and rich operating modes in accordance with selected time delays after upper and lower threshold values for the lambda value downstream from the $NO_x$ storage catalyst have been respectively exceeded and undershot.

13. A method for desulfurization of an $NO_x$ storage catalyst arranged in an exhaust duct of a combustion engine, at least one lambda probe arranged downstream from the $NO_x$ storage catalyst, comprising the steps of:
alternatingly operating the combustion engine in a lean operating mode and a rich operating mode;
monitoring progress of desulfurization in accordance with a characteristic curve of a lambda-probe voltage downstream from the $NO_x$ storage catalyst; and
ascertaining a lambda-probe voltage after a specifiable interval after a beginning of an nth rich operating phase;
wherein, during desulfurization, a temperature of the $NO_x$ storage catalyst one of equals and exceeds a minimum desulfurization temperature.

14. The method according to claim 13, further comprising the step of determining the beginning of the nth rich operating phase in accordance with a lambda value in front of the $NO_x$ storage catalyst falling below a specifiable lambda threshold value, the specifiable lambda threshold value less than 1 and greater than a preselected lambda value in front of the $NO_x$ storage catalyst.

15. The method according to claim 13, wherein the specifiable interval corresponds to a time span.

16. The method according to claim 13, wherein the specifiable interval corresponds to a mass of exhaust gas passing through the $NO_x$ storage catalyst.

17. The method according to claim 16, wherein the specifiable interval corresponds to a mass of reducing agent passing through the $NO_x$ storage catalyst.

18. The method according to claim 13, wherein the specifiable interval corresponds to a length of the rich operating phases.

19. The method according to claim 13, wherein a time characteristic of the lambda value in front of the $NO_x$ storage catalyst corresponds to a rectangular profile during desulfurization.

20. The method according to claim 13, wherein a time characteristic of the lambda value in front of the $NO_x$ storage catalyst corresponds to a triangular profile during desulfurization.

21. The method according to claim 13, further comprising the step of triggering a shift from the lean operating mode to the rich operating mode in accordance with a specifiable lambda threshold value downstream from the $NO_x$ storage catalyst being exceeded, the specified lambda threshold value downstream from the $NO_x$ storage catalyst greater than 1 and less than a preselected lambda value in front of the $NO_x$ storage catalyst.

22. A method for desulfurization of an $NO_x$ storage catalyst arranged in an exhaust duct of a combustion engine, at least one lambda probe arranged downstream from the $NO_x$ storage catalyst, comprising the steps of:
alternatingly operating the combustion engine in a lean operating mode and a rich operating mode;
monitoring progress of desulfurization in accordance with a characteristic curve of a lambda-probe voltage downstream from the $NO_x$ storage catalyst;
ascertaining a lambda-probe voltage after a specifiable interval after a beginning of an nth rich operating phase;
calculating a difference of the lambda-probe voltage of the nth rich operating phase and the lambda-probe voltage of a preceding rich operating phase; and
ending the desulfurization when the difference falls below a specifiable limiting value for the difference at least once.

23. The method according to claim 22, wherein the calculating step includes the substep of calculating a difference of the lambda-probe voltage of the nth rich operating phase and the lambda-probe voltage of the rich operating phase directly preceding it.

24. A method for desulfurization of an $NO_x$ storage catalyst arranged in an exhaust duct of a combustion engine, at least one lambda probe arranged downstream from the $NO_x$ storage catalyst, comprising the steps of:

alternatingly operating the combustion engine in a lean operating mode and a rich operating mode;

monitoring progress of desulfurization in accordance with a characteristic curve of a lambda-probe voltage downstream from the $NO_x$ storage catalyst;

ascertaining a lambda-probe voltage after a specifiable interval after a beginning of an nth rich operating phase; and triggering a change between the lean and rich operating modes in accordance with selected time delays after upper and lower threshold values for the lambda value downstream from the $NO_x$ storage catalyst have been respectively exceeded and undershot.

25. A method for desulfurization of an $NO_x$ storage catalyst arranged in an exhaust duct of a combustion engine, at least one lambda probe arranged downstream from the $NO_x$ storage catalyst, comprising the steps of:

alternatingly operating the combustion engine in a lean operating mode and a rich operating mode; and monitoring progress of desulfurization based on the duration of a constant interval in a lambda probe reading of the lambda probe.

* * * * *